United States Patent Office 3,337,463
Patented Aug. 22, 1967

3,337,463
FOAMING DETERGENT COMPOSITIONS
Irving R. Schmolka, Grosse Ile, Mich., assignor to Wyandotte Chemicals Corporation, Wyandotte, Mich., a corporation of Michigan
No Drawing. Filed Oct. 18, 1963, Ser. No. 317,144
9 Claims. (Cl. 252—89)

The present invention relates to detergent compositions having enhanced and stabilized foaming characteristics and more particularly it relates to such compositions which contain nonionic detergents.

Nonionic polyoxyalkylene surface active agents composed of a water-insoluble or hydrophobic nucleus, such as a long hydrocarbon chain or an alkyl-substituted ring compound, e.g. nonylphenol, and a water-solubilizing polyoxyethylene chain are well known in the art. A basically new approach for the chemical structure of a polyoxyalkeylene nonionic surface active agent is disclosed in U.S. Patent 2,674,619 and Canadian Patent 540,357. The compositions disclosed in these patents depart from the structure of the previously known nonionic surface active agents by employing a defined polyoxypropylene polymer as the hydrophobic element of this surfactant. The compositions of U.S. 2,674,619 and Canadian 540,357 are initially prepared by condensing the required amount of propylene oxide with an organic compound containing a plurality of reactive hydrogen atoms, followed by condensation with ethylene oxide so as to produce water solubility and introduce surface active properties. The disclosure of these patents teaches that the reactive hydrogen compound may be any of a broad group of organic compounds which have at least two reactive hydrogen atoms and are relatively low molecular weight materials which are not hydrophobic in and of themselves. In the compositions of U.S. Patent 2,674,619 and Canadian Patent 540,357, a significant contribution is made to the art since properties of the compositions can be varied widely by varying the molecular weight of the polyoxypropylene chain and/or the weight percent of ethylene oxide condensed with the polyoxypropylene chain.

Particularly desirable among the compounds of the class disclosed in U.S. Patent No. 2,674,619 and Canadian Patent 540,357 are the water-soluble conjugated polyoxypropylene-polyoxyethylene compounds containing in their structure oxypropylene groups, oxyethylene groups, and a nucleus of propylene glycol. These compounds are prepared by condensing ethylene oxide with a hydrophobic polyoxypropylene glycol base formed by the condensation of propylene oxide with propylene glycol. The average molecular weight of the polyoxypropylene polymers must be at least about 900. The disclosure of these two patents include such compounds where the oxyethylene groups present constitute 5 to 90% of the weight.

The increasing addition or condensation of ethylene oxide on a given water-insoluble polyoxypropylene glycol base tends to increase its water-solubility and raise the melting point such that the products may be water-soluble, and normally liquid, pasty or solid in physical form. With an ethylene oxide content of up to 50%, there are usually obtained normally liquid products, above 50% soft wax-like products, and from about 70–90% normally solid products may be obtained which can be prepared in flake form if desired. These polyoxyethylene condensates with polyoxypropylene glycol may be designated by the following structure:

$$HO—(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90% of the total molecular weight of the compound.

Compounds of this type are sold commercially by the Wyandotte Chemicals Corporation under the trademark Pluronic and are described in the brochure entitled, The Pluronic Grid Approach, volume II, nineteen hundred and fifty-seven, published by the Wyandotte Chemicals Corporation, Wyandotte, Mich. The following are examples of compounds corresponding to the above formula as disclosed in the brochure.

TABLE I

| Name | Mol. Wt. Polyoxypropylene Base | Ethylene Oxide Content in Final Product, Wt. Percent | Mol. Wt. of Final Product |
|---|---|---|---|
| Pluronic L33 | 950 | 30 | 1,357 |
| Pluronic L35 | 950 | 50 | 1,900 |
| Pluronic F38 | 950 | 80 | 4,750 |
| Pluronic L42 | 1,200 | 20 | 1,500 |
| Pluronic L43 | 1,200 | 30 | 1,714 |
| Pluronic L44 | 1,200 | 40 | 2,000 |
| Pluronic P46 | 1,200 | 60 | 3,000 |
| Pluronic L64 | 1,750 | 40 | 2,917 |
| Pluronic P66 | 1,750 | 60 | 4,375 |

Also desirable among the polymers of the general class disclosed in U.S. Patent 2,674,619 are the conjugated polyoxypropylene-polyoxyethylene compounds containing in their structure the nucleus of ethylene diamine, oxypropylene groups, and oxyethylene groups. The structure of the compounds is such that all of the oxypropylene groups are present in oxypropylene chains that are attached to the reactive hydrogen compound at the sites of the reactive hydrogen atoms, and all the oxyethylene groups are present in oxyethylene chains that are attached to the ends of the oxypropylene chains. The minimum average molecular weight of the oxypropylene chains is generally about 250 and can range up to about 25,000 and higher, and the oxyethylene chains are present in an amount so as to constitute from 10 to 90 weight percent of the mixture of compounds.

The product of the sequential addition of propylene oxide and ethylene oxide to ethylene diamine may be represented by the formula:

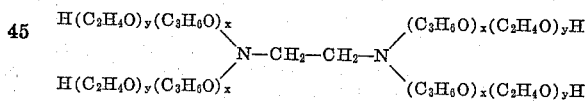

wherein $x$ is sufficiently large to provide a molecular weight of the oxypropylene chains of at least about 250 and wherein $y$ is sufficiently large to provide about 10 to 90% of the total molecular weight of the compound.

Compounds in this class are sold commercially by the Wyandotte Chemicals Corporation under the trademark Tetronic and are described in the brochure entitled Technical Data on Tetronic Series Nonionic Surface Active Agents, dated Apr. 29, 1957, published by the Wyandotte Chemicals Corporation, Wyandotte, Mich. The following are examples of compounds corresponding to the above formula disclosed in the brochure.

TABLE II

| Name | Nominal Mol. Wt. Ethylene Diamine Propylene Oxide Base | Nominal Ethylene Oxide Content in Final Product, Wt. Percent | Nominal Mol. Wt. of Final Product |
|---|---|---|---|
| Tetronic 304 | 750 | 45 | 1,650 |
| Tetronic 504 | 1,750 | 45 | 3,000 |
| Tetronic 505 | 1,750 | 55 | 4,158 |

While the above-described polyoxyalkylene detergents represent a valuable class of detergents, most of them have comparatively poor foaming power and/or poor foam stability. While for many applications it is desirable to have such low foaming power or foam stability, there are many applications where the characteristics of this particular group of polyoxyalkylene detergents are desired wherein improved foaming power and/or foam stability are also desired and it is advantageous to be able to improve the foaming power and/or foam stability of these detergent compounds.

Accordingly, it is a purpose of this invention to provide nonionic polyoxyalkylene detergent compounds of the type employing propylene oxide groups as the hydrophobic element and ethylene oxide groups as the hydrophilic element which have improved foam characteristics.

In accordance with this invention a mixture of polyoxyalkylene condensates of cellulose containing oxyethylene groups are incorporated as foaming agents with at least one nonionic detergent, selected from the group consisting of (a) a mixture of conjugated polyoxyalkylene compounds corresponding to the formula:

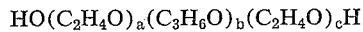

wherein $b$ is an integer sufficiently high to provide a molecular weight of at least about 900 for the oxypropylene base and wherein $a+c$ is an integer sufficiently high to provide 5 to 90% of the total molecular weight of the compound and (b) a mixture of conjugated polyoxyalkylene compounds corresponding to the formula:

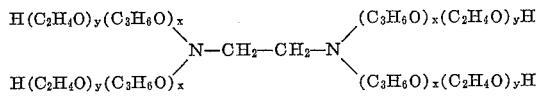

wherein $x$ is sufficiently large to provide a molecular weight of the oxypropylene chains of at least about 250 and wherein $y$ is sufficiently large to provide about 10 to 90% of the total molecular weight of the compound to enhance that foaming action of the detergent composition.

It should be noted that where the term "molecular weight" is stated with respect to the polyoxyalkylene condensates of cellulose in this specification and claims, unless otherwise noted, there is meant the average theoretical molecular weight of the oxyalkylene groups other than oxyethylene groups per glucose unit of the cellulose. This equals the total of the grams of alkylene oxide other than ethylene oxide employed per glucose unit of the cellulosic material. It is apparent from this definition that the term "molecular weight" as applied herein to the polyoxyalkylene condensates of cellulose does not account for the oxyethylene groups. It is preferred to account for the oxyethylene groups by reciting the weight percent of oxyethylene groups in the complete molecule. It is well recognized in the field of alkylene oxide chemistry that the polyoxyalkylene compositions obtained by condensing alkylene oxides with other materials are actually mixtures of compounds rather than a single molecular compound. The mixture contains closely related homologues wherein the statistical average number of oxyalkylene groups equals the number of mols of alkylene oxide employed and the individual members of the mixture contain varying numbers of oxyalkylene groups. Thus the polyoxyalkylene condensates of cellulose employed in this invention are mixtures of compounds which are defined respectively by the theoretical molecular weight of the polyoxyalkylene chains other than oxyethylene chains per glucose unit of the cellulosic material, and by weight percent of oxyethylene chains in the compound based on the weight of the total molecule.

The polyoxyalkylene condensates of cellulose containing oxyethylene groups may be prepared by reacting at least one alkylene oxide including ethylene oxide with cellulosic material in the presence of either at least one high molecular weight polyoxyalkylene alcohol derivative or in the presence of a suitable alcohol such as tertiary butanol. The reaction of the alkylene oxide or oxides with the cellulosic material in the presence of at least one high molecular weight polyoxyalkylene alcohol derivative is disclosed in the copending U.S. patent application entitled, "Oxyalkylene Condensates of Cellulose," Ser. No. 314,480, filed Oct. 7, 1963, by John T. Patton, Jr. and Henry E. Reich. This application discloses preparing oxyalkylene derivatives of cellulose by mixing a cellulosic material with an alkali such as sodium or potassium hydroxide, water and at least one high molecular weight polyoxyalkylene alcohol derivative, e.g., polyoxypropylene glycols. These polyoxyalkylene alcohol derivatives are also mixtures of closely related homologues. By the term "molecular weight" as applied to these polyoxyalkylene derivatives of alcohols is meant the average theoretical molecular weight of the molecule. This equals the total grams of the alkylene oxide and alcohol per mol of alcohol involved in producing this derivative. A molecular weight of at least about 1000 per hydroxyl group of such derivative is preferred. While there is no upper limit to the molecular weight, a suitable maximum for normal practice is about 100,000 per hydroxyl group.

Alkylene oxide is reacted with the cellulosic material in the presence of the alkali, water and polyoxyalkylene alcohol derivative by gradually adding alkylene oxide to the mixture of alkali, water and polyoxyalkylene alcohol derivative. The preferred polyoxyalkylene condensates of cellulose are the reaction products of from about 40 to 4000 mols total alkylene oxide per glucose unit of the cellulose. To overcome difficulties presented by volume limitations of the reactors employed the reaction may be carried out in two or more stages. The cellulosic material may be any appropriate cellulosic raw material, such as chemical cotton, cotton linters or wood-pulp, conventionally used in chemical reactions. The cellulosic material, alkali, water and the polyoxyalkylene alcohol derivative are charged into a pressure vessel such as an autoclave, generally at ambient temperature and pressure, and the mixture heated to a temperature of from about 50 to 80° C. The alkylene oxide is then gradually added to the material in the pressure vessel. The pressure and temperature are gradually increased as the material is added to a pressure preferably from about 65 to 150 p.s.i.g. and a temperature preferably from about 125 to 160° C. For practical purposes, generally the pressure will not exceed 500 p.s.i.g. and the temperature will not exceed 200° C. After completion of addition, the material may be maintained at said maximum temperature and pressure for a period of from about 0.5 to 1.5 hours to complete the reaction. The product is then cooled and the material removed from the pressure vessel.

The following examples further illustrate the preparation of the polyoxyalkylene condensates of cellulose.

EXAMPLE 1

Part A 82 grams of mechanically pulverized wood pulp cellulose, 40 grams of sodium hydroxide as a 50% aqueous solution and 550 grams of a polypropylene glycol having a theoretical molecular weight of 4800 are charged into a clean one-gallon stainless steel autoclave which is provided with a mechanical agitator that is operated throughout the reaction. This reactor or autoclave is then sealed, purged with nitrogen and pressure tested at 80–90 p.s.i.g. for 5 minutes with the agitator in operation. If the system is tight, the system is vented to zero and then heated to about 50° C. Next, 1800 grams of propylene oxide feed is added over a period of 8 hours. After one hour of operation, the reaction temperature is gradually increased to about 120° C. The pressure gradually increases to a final pressure of 75 p.s.i.g. After completion of the oxide addition, the reaction mixture is stirred at 120° C. for 60 minutes. The material is then cooled to 50° C. and discharged. The product is a polyoxypropylene condensate of cellulose having a theoretical molecular weight of 3764 per glucose unit of the cellulose.

Part B 1025 grams of the crude unneutralized cellulose condensate produced above is charged into the above-described autoclave at a temperature of 25° C., and the system is purged as described above. The material in the autoclave is agitated throughout the process. The autoclave is heated to 125° C., the pressure is adjusted to zero p.s.i.g., and the propylene oxide feed is initiated. 1600 grams of propylene oxide is added over a period of about 6 hours with the final temperature and pressure being 125° C. and 90 p.s.i.g. After completion of the oxide addition, the reaction mixture is stirred for 60 minutes at 125° C. The product is cooled to 50° C. and discharged.

The residual sodium hydroxide is neutralized with phosphoric acid and the remaining volatile materials are removed by stripping at reduced pressure. The product is then filtered through a bed of particles of diatomaceous earth. The product is a polyoxypropylene condensate of cellulose which is a viscous, amber liquid having a theoretical molecular weight of 12,000 per glucose unit of the cellulose.

EXAMPLE 2

Part A

A polyoxypropylene condensate of cellulose having a theoretical molecular weight of 4450 per glucose unit of the cellulose is prepared by a method substantially as described in Part A of Example 1 with the exception that 56 grams of potassium hydroxide as a 50% aqueous solution is substituted for the 40 grams of 50% aqueous sodium hydroxide solution.

Part B 500 grams of the crude unneutralized cellulose condensate produced in Part A is reacted with 2000 grams of propylene oxide wherein the propylene oxide is added over a period of 10 hours, all in a manner substantially the same as set forth in Part B of Example 1. The residual potassium hydroxide of the crude product is neutralized with phosphoric acid and the volatile materials are removed by stripping under reduced pressure. The product is then filtered through a bed of particles of diatomaceous earth. The product is a polyoxypropylene condensate of cellulose which is a viscous, amber liquid having a theoretical molecular weight of 22,200 per glucose unit of the cellulose.

EXAMPLE 3

Part A

A polyoxypropylene condensate of cellulose having a theoretical molecular weight of 3764 per glucose unit of the cellulose is prepared by a method substantially the same as that set forth in Part A of Example 1 with the exception that cellulose pulp made by the kraft sulfate process was substituted for the cellulosic material of Part A, 80 rather than 40 grams of 50% aqueous sodium hydroxide solution was employed, and a polypropylene glycol having a theoretical molecular weight of 6500 was employed in lieu of one having a theoretical molecular weight of 4800.

Part B 488 grams of crude unneutralized cellulose condensate of Part A is reacted with 2124 grams of propylene oxide wherein the propylene oxide is added over a period of 8 hours, all in a manner substantially the same as that described in Part B of Example 1. The residual sodium hydroxide of the crude product is neutralized with phosphoric acid and the volatile materials are removed by stripping under reduced pressure. The product is then filtered through a bed of particles of diatomaceous earth. The product is a polyoxypropylene condensate of cellulose which is a viscous, amber liquid having a theoretical molecular weight of 25,000 per glucose unit of the cellulose.

EXAMPLE 4

Part A

A polyoxypropylene condensate of cellulose which is a viscous, amber liquid having a theoretical molecular weight of 3764 per glucose unit of the cellulose is prepared by a method substantially the same as that set forth in Part A of Example 1 with the exception that 550 grams of a propylene oxide condensate with pentaerythritol having a theoretical molecular weight of 4000 is employed in lieu of the propylene glycol.

Part B 1025 grams of crude unneutralized polyoxypropylene condensate of cellulose of Part A is reacted with 1600 grams of propylene oxide, all in a manner substantially the same as that described in Part B of Example 1. The residual sodium hydroxide of the crude product is neutralized with phosphoric acid and the volatile materials are removed by stripping under reduced pressure. The product is then filtered through a bed of particles of diatomaceous earth. The product is a polyoxypropylene condensate of cellulose which is a viscous, amber liquid having a theoretical molecular weight of 12,000 per glucose unit of the cellulose.

EXAMPLE 5

Part A

A polyoxybutylene condensate of cellulose having a theoretical molecular weight of 4000 per glucose unit of the cellulose is prepared by a method substantially the same as that set forth in Part A of Example 1 with the exception that 550 grams of a propylene oxide condensate with pentaerythritol having a theoretical molecular weight of 4000 is employed in lieu of the propylene glycol, and 1918 grams of 1,2-butylene oxide feed is substituted for the propylene oxide feed.

Part B 957 grams of the crude unneutralized polyoxybutylene condensate of cellulose of Part A is reacted with 1480 grams of 1,2-butylene oxide, all in a manner substantially the same as that described in Part B of Example 1. The residual sodium hydroxide of the crude product is neutralized with phosphoric acid and the volatile materials are removed by stripping under reduced pressure. The product is then filtered through a bed of particles of diatomaceous earth. The product is a polyoxybutylene condensate of cellulose which is a viscous, amber liquid having a theoretical molecular weight of 12,000 per glucose unit of the cellulose.

EXAMPLE 6

Part A

A polyoxybutylene condensate of cellulose which is a viscous, amber liquid having a theoretical molecular weight of 4000 per glucose unit of the cellulose is prepared by a method substantially the same as that set forth in Part A of Example 1 with the exception that 550 grams of a 1,2-butylene oxide condensate with trimethylolpropane having a theoretical molecular weight of 6000 is employed in lieu of the propylene glycol and 1918 grams of 1,2-butylene oxide feed is substituted for the propylene oxide feed.

Part B 957 grams of the crude unneutralized polyoxybutylene condensate of cellulose of Part A is reacted with 1480 grams of 1,2-butylene oxide, all in a manner substantially the same as that described in Part B of Example 1. The residual sodium hydroxide of the crude product is neutralized with phosphoric acid and the volatile materials are removed by stripping under reduced pressure. The product is then filtered through a bed of particles of diatomaceous earth. The product is a polyoxybutylene condensate of cellulose which is a viscous, amber liquid having a theoretical molecular weight of 12,000 per glucose unit of the cellulose.

EXAMPLE 7

Part A

A polyoxybutylene condensate of cellulose which is a viscous, amber liquid having a theoretical molecular weight of 4000 per glucose unit of the cellulose is prepared by a method substantially the same as that set forth in Part A of Example 1 with the exception that 550 grams of a propylene oxide condensate with anhydroenneaheptitol having a theoretical molecular weight of the oxypropylene units of 4000 is employed in lieu of the propylene glycol and 1918 grams of 1,2-butylene oxide feed is substituted for the propylene oxide feed.

Part B 957 grams of the crude unneutralized polyoxybutylene condensate of cellulose is reacted with 1480 grams of 1,2-butylene oxide, all in a manner substantially the same as that described in Part B of Example 1. The residual sodium hydroxide of the crude product is neutralized with phosphoric acid and the volatile materials are removed by stripping under reduced pressure. The product is then filtered through a bed of particles of diatomaceous earth. The product is a polyoxybutylene condensate of cellulose which is a viscous, amber liquid having a theoretical molecular weight of 12,000 per glucose unit of the cellulose.

EXAMPLE 8

Part A

A polyoxypropylene condensate of cellulose having a theoretical molecular weight of 3764 per glucose unit of the cellulose is prepared by a method substantially the same as that set forth in Part A of Example 1 with the exception that the propylene oxide feed is added over a period of 10 hours rather than 8 hours.

Part B 500 grams of the crude unneutralized cellulose condensate of Part A is reacted with 2200 grams of propylene oxide which is added over a period of 9 hours in the manner substantially as described in Part B of Example 1. The material produced is cooled to 30° C. and discharged. The product is a polyoxypropylene condensate of cellulose having a theoretical molecular weight of 20,400 per glucose unit of the cellulose.

Part C 1200 grams of the crude unneutralized cellulose condensate produced in Part B is reacted with 975 grams of ethylene oxide which is added over a period of 4 hours, all in a manner substantially as described in Part B of Example 1. The product is cooled to 50° C. and discharged. Residual sodium hydroxide is neutralized with phosphoric acid and the remaining volatile materials are removed by stripping under reduced pressure. The product is then filtered through a bed of particles of diatomaceous earth. The product is a polyoxypropylene, polyoxyethylene condensate of cellulose which is a viscous, amber liquid having a theoretical molecular weight of 20,400 per glucose unit of the cellulose and a weight percent of oxyethylene groups based on the total weight of the product of 45 percent.

EXAMPLE 9

Part A

Three polyoxypropylene condensates of cellulose, each having a theoretical molecular weight of 3764 per glucose unit of the cellulose, are prepared by a method substantially the same as that set forth in Part A of Example 1 with the exception that all three products employ a different quantity of sodium hydroxide from that in Example 1, the propylene oxide is added over a 10-hour period and each of the three products is prepared from a different cellulosic material. One product is prepared from mechanically pulverized wood pulp cellulose as in Example 1, while another is prepared from cotton linters. In preparing these two products, 80 grams of 50% aqueous sodium hydroxide solution are employed rather than 40 grams of 50% aqueous sodium hydroxide solution as in Example 1. The third product is prepared from alkali cellulose which consists of 45% cellulose (10 parts soft kraft pulp made by the sulfate process and 1 part mechanically pulverized cellulose pulp), 35% water and 20% sodium hydroxide. The material is prepared by steeping the cellulosic material with 36% sodium hydroxide solution. The sodium hydroxide present in this alkali cellulose serves the purpose of the 50% sodium hydroxide solution of Example 1.

Part B 488 grams of each of the crude unneutralized cellulose condensates produced in Part A is reacted with 2124 grams of propylene oxide wherein the propylene oxide is added over a period of 8 hours, all in a manner substantially the same as that described in Part B of Example 1. The product is a polyoxypropylene condensate of cellulose having a theoretical molecular weight of 25,000 per glucose unit of the cellulose.

Part C 850-gram portions of each of the crude unneutralized polyoxypropylene condensates of cellulose produced in Part B above are reacted with 1700 grams of ethylene oxide, the ethylene oxide being added over a period of about 7 hours, all in a manner substantially as described in Part B of Example 1. The residual sodium hydroxide of the crude product is neutralized with phosphoric acid and the remaining volatile materials removed by stripping at reduced pressure. Each product is then filtered through a bed of diatomaceous earth. These products are polyoxypropylene, polyoxyethylene condensates of cellulose which are light-colored liquids having a theoretical molecular weight of 25,000 per glucose unit of the cellulose, and a weight percent of oxyethylene groups based on the total weight of the product of 67%.

Part D

A 1400-gram portion of the crude unneutralized polyoxypropylene condensate of cellulose obtained in Part B wherein the original cellulosic material is mechanically pulverized wood pulp is reacted with 1400 grams of propylene oxide wherein the propylene oxide is added over over a period of 6 hours, all in the manner substantially as described for Part B of Example 1. The product is a polyoxypropylene condensate of cellulose which is a light-colored liquid having a theoretical molecular weight of 50,000 per glucose unit of the cellulose.

600 grams of this crude unneutralized polyoxypropylene condensate of cellulose is reacted with 1400 grams of ethylene oxide, the ethylene oxide being added over a period of about 7 hours, all in the manner substantially as described in Part B of Example 1. The residual sodium hydroxide of the crude product is neutralized with phosphoric acid and the remaining volatile materials are removed by stripping at reduced pressure. The product is then filtered through a bed of particles of diatomaceous earth. The final product is a polyoxypropylene, polyoxyethylene condensate of cellulose which is a light-colored liquid having a theoretical molecular weight of 50,000 per glucose unit of cellulose, and a weight percent of oxyethylene groups based on the total weight of the product of 70%.

Where the reaction medium is an alcohol such as tertiary butanol the process of preparation is substantially the same as that described above and in the John T. Patton, Jr., and Henry E. Reich U.S. patent application Ser.

No. 314,480 cited above with the exception that tertiary butanol is substituted for the polyoxyalkylene alcohol derivative and an additional step is required during the procedure wherein the tertiary butanol is removed by suitable means, such as a conventional distillation process.

The preferred alkylene oxides which may be employed with either reaction medium are propylene oxide in combination with ethylene oxide to produce cellulose-based block copolymers of ethylene oxide and propylene oxide. For purposes of this invention ethylene oxide is an essential component. However, propylene oxide is not essential and ethylene oxide may be the only alkylene oxide employed. In addition, other alkylene oxides such as 1,2-butylene oxide, 2,3-butylene oxide, butadiene monoxide, cyclohexane oxide, glycidyl ethers such as methylglycidyl ether, allylglycidyl ether, phenylglycidyl ether, the epoxypentanes, epoxyheptanes, styrene oxide and the like may be substituted for the propylene oxide. Any combination of 2 or more alkylene oxides may also be employed.

The amount or proportion of the polyoxyalkylene condensate of cellulose should be sufficient to obtain the desired effects in foaming power. The desired effects in foaming power may be obtained with varying ratios of the essential ingredients depending upon the specific material employed, conditions of use, etc. In general, the polyoxyalkylene condensates of cellulose may be present in proportions ranging from a ratio of 1 part by weight of cellulose condensate to 10,000 parts by weight of the detergent to 1 part by weight of cellulose condensate to 1 part by weight of detergent. A more preferred range of weight ratios of polyoxyalkylene condensates of cellulose to nonionic detergent which will give good foam characteristics is from about 1:1000 to 1:10. The detergent compositions of this invention may be prepared by dissolving one component in the other where at least one is a liquid thereby making a simple mechanical mixture of the two components or a more intimate mixture may be made by melting the two components together and then cooling when both are solids. The compositions of this invention may be in the form of solutions, pastes, granules, or powders.

Other surface active agents may be admixed with the above-specified nonionic detergent and polyoxyalkylene condensates of cellulose disclosed in an amount ranging from about 0 to 20 percent by weight of the above-specified nonionic detergent, for example propylene tetramer derivatives such as alkyl benzene sulfonates, fatty alcohol sulfates such as sodium lauryl sulfate, sulfated tridecyl alcohol ethoxylates and other sulfated nonionics, cationics such as lauryl benzyl dimethyl ammonium chloride, nonionics such as nonyl phenol ethoxylates, ethoxylated fatty amines, fatty acids, fatty amides and diamides such as lauric diethanolamide, anionics derived from the condensation of propylene tetramer or pentamer and benzene, the product then sulfonated and neutralized to form an alkyl benzene sulfonate, fatty alcohol sulfates and the like.

Aqueous washing solutions suitable for many purposes containing from about 0.01 to 5.0 weight percent of detergent composition of this invention may be prepared.

The detergent compositions of the present invention can be used alone or compounded with any of those substances employed by the art in admixture with detergent compositions generally, provided the use of any such materials does not neutralize or remove the desired effects.

The detergent mixture of the invention is readily formulated with alkaline, acid or neutral builder salts and auxiliary additives such as optical brighteners, anti-soil redeposition agents, for example, carboxymethylcellulose, anti-tarnishing agents, plasticizers, inert fillers, bleaches, solvents, dyes, perfumes, etc. in formulations in which those who practice the art of compounding synthetic detergents for cleaning and cosmetic uses are well versed.

The alkaline builder salts which can be employed in conjunction with the detergent compositions of the present invention include, for example, alkali metasilicates, phosphates, including the molecularly dehydrated phosphates, carbonates and borates and, to a lesser extent, alkali metal hydroxide. Typical alkaline builder salts are sodium orthosilicate, sodium meta-silicate, sodium carbonate, trisodium phosphate, sodium tripolyphosphate, tetrasodium pyrophosphate, sodium hexametaphosphate, and sodium tetraborate. A preferred alkaline builder is a mixture of sodium silicate, sodium carbonate and sodium tripolyphosphate. For commercial laundry operations the alkaline builder most advantageously contains a mixture of about 40 to 99 parts by weight of sodium metasilicate and about 1 to 60 parts by weight of sodium carbonate wherein from about 1 to 20 parts of sodium carbonate can be substituted with sodium tripolyphosphate or other molecularly dehydrated phosphates. In the case of a household product, a higher proportion of sodium tripolyphosphate and a corresponding reduction in the proportions of silicate and carbonate would be desirable. The alkaline builder salt or a mixture of alkaline builder salts is generally present in the built surfactant composition in an amount sufficient to impart to an aqueous solution thereof a pH in the range of about 9.5 to 12.5

When mixed with alkaline builder salt such as anhydrous sodium metasilicate, the nonionic surfactant mixtures of the invention undergo during storage discoloration from white to brown. This chromatolysis during storage can be eliminated by formulating with the dry built detergent a finely divided highly porous inorganic siliceous absorbefacient. The siliceous compounds which can be employed to prevent discoloration of the built detergent include, for example, synthetic calcium silicate, fuller's earth, silica gel, divided silica, diatomaceous earth, bentonite and mixtures thereof. The preferred inorganic siliceous compound is synthetic calcium silicate. For some cleaning purposes it has also been found that the presence of kerosene in the powered or dry formulation substantially enhances deterging properties of the formulation, particularly with respect to oil soil removal from fabrics. The term "kerosene" as used herein defines a mixture of hydrocarbons having a boiling point from about 150° C. to 350° C. wherein the mixture is usually obtained as a distillate from petroleum or shale oil.

The compositions of the invention can also be formulated with colloidal suspending agents such as sodium carboxymethyl-cellulose and optical brighteners such as benzyl beta-methyl umbelliferone.

The sum of the amounts of the nonionic detergents plus any additional surface active agents and the polyoxyalkylene condensate of cellulose in a built detergent composition is preferably from about 3 to 20 weight percent and the alkaline builder salt is preferably present in the built detergent formulation in an amount from about 80 to 97 weight percent. Auxiliary additives such as inorganic siliceous compounds and possibly kerosene which impart improved properties to the composition are substitutions for a portion of the alkaline builder salt. Thus the inorganic siliceous compound which is employed to prevent discoloration is employed in an amount from about 3 to 13 percent by weight and kerosene where employed is employed in an amount from about 1 to 10 percent by weight.

In a preferred embodiment of the built deterent composition the sum of the amounts of the polyoxyalkylene condensates of cellulose and the specified nonionic detergent range from about 3 to 20 weight percent of the composition, the amount of the alkaline builder salt ranges from about 67 to 94 weight percent and the amount of inorganic siliceous compound ranges from about 3 to 13 weight percent. The powdered compositions can be prepared by mixing the ingredients in a dry blender such as a ribbon mixer.

For washing dishes or cleaning fabrics an aqueous solution of the built detergent may be employed at a temperature from about 90 to 120° F. wherein the built detergent is present in an amount from about 0.02 to 10 weight percent. Fabrics are generally washed in such aqueous solutions for about 20 to 30 minutes followed by one or more rinses.

The following examples are presented to particularly illustrate the invention.

EXAMPLE I

A series of detergent compositions according to this invention was prepared wherein exemplary polyoxypropylene polyoxyethylene condensates of cellulose having varying theoretical molecular weights and varying weight percentages of ethylene oxide were incorporated as foaming agents with exemplary nonionic detergents having varying amounts of polyoxypropylene and polyoxyethylene units. Aqueous solutions were prepared from these detergent compositions of the invention, from each nonionic detergent alone and from each foaming agent alone. The cellulose condensates were prepared by reacting propylene oxide with cellulosic material in the presence of the "reaction medium" indicated in Table III below followed by reaction of the product with ethylene oxide in the presence of this "reaction medium." Where polypropylene glycol is indicated as the "reaction medium," a polypropylene glycol having a theoretical molecular weight of 4800 was employed. The reaction was carried out in two or three stages due to volume limitations imposed by the reactors. The procedure by which these polyoxyalkylene condensates with cellulose were made was that generally set forth above and set forth in the copending patent application to John T. Patton, Jr., and Henry E. Reich, Ser. No. 314,480 cited above. The theoretical molecular weight of the polyoxypropylene chains per glucose unit of the cellulose and the weight percent of oxyethylene groups in the cellulose condensate are set forth in Table III below under the headings Mol Weight and Percent Ethylene Oxide, respectively.

In order to converse space in Table III the nonionic detergents are indicated by their Pluronic and Tetronic designations employed by the Wyandotte Chemicals Corporation. These detergents are disclosed in detail in Tables I and II above. The foaming properties of the compositions of this invention, the nonionic polyoxyalkylene detergents themselves and the foaming agents themselves were determined by the test procedure set forth in the paper, "New Dynamic Method of Detergent Foam Measurement," by Henry E. Reich, John T. Patton, Jr., and C. V. Francis published in Soap and Chemical Specialties, April 1961. This procedure as applied to the compositions of this example may be described as follows:

*Foam height test procedure*

To evaluate the foam characteristics of the compositions of this invention, a solution of the composition containing 0.1% of the nonionic polyoxyalkylene detergent and 0.002% of the cellulose condensate foaming agent was prepared in tap water and 10 liters of the solution were placed in a Pyrex jar measuring 10" in diameter and 10" in height. This Pyrex jar was equipped with a propeller-type stirrer, knife blade heaters, a thermoregulator and a thermometer. A small centrifugal pump was arranged to circulate the solution contained in this jar through a calibrated glass flow meter to a jet orifice prepared from the base of a No. 20 Becton, Dickinson and Company hypodermic needle by enlarging the hole in the base with a No. 56 twist drill. The jet orifice was mounted coaxially inside a Pyrex glass tube (51 mm. by 910 mm.) which was placed vertically in the solution. The jet was positioned so that it was 700 mm. above the surface of the solution in the jar, and the Pyrex tube was arranged to project 210 mm. below the surface of the solution.

The solution was brought to temperature by means of the knife blade heater and maintained at a constant temperature by means of a thermoregulator. The centrifugal pump was started and the flow rate of solution was metered through the jet. The flow was adjusted by bypassing part of the stream back into the Pyrex jar before passage through the flow-meter. The solution passing through the jet was directed against the wall of the vertical tube while the flow was adjusted and the temperature was equilibrated in order to prevent foaming prior to the actual determination. The jet was then arranged to pass the solution coaxially downward through the tube touching the tube walls to impinge upon the surface of the solution located in the Pyrex tube. Timing was initiated from the instant the solution impinged on the liquid surface, and the foam height was read at the time intervals indicated in Table III below. The foam height readings were obtained from a calibration on the outside of the Pyrex tube with the zero mark being at the surface of the solution. This procedure was also followed to evaluate the foam characteristics of the nonionic polyoxyalkylene detergent itself and the foaming agent itself. A 0.10% by weight solution of the nonionic detergent was tested and 0.002% by weight solution of the foaming agent was tested. Table III below presents the detergent compositions and foam characteristics.

TABLE III.—DYNAMIC FOAM TEST

| Composition No. | Cellulose Condensate | | | Detergent | Flow, ml./min. | Temp., °F. | Dynamic Foam Measurement Test | | | | | | | |
|---|---|---|---|---|---|---|---|---|---|---|---|---|---|---|
| | Reaction Medium | Theoretical, mol. wt. | Percent Ethylene Oxide | | | | Ascent (min.) | | | | Descent (min.) | | | |
| | | | | | | | 0.5 | 2.0 | 5.0 | 10.0 | 0.5 | 2.0 | 5.0 | 10.0 |
| 1 | | None | | Pluronic L44 | 400 | 100 | 20 | 30 | 40 | 50 | 10 | 0 | 0 | 0 |
| 2 | T. butanol | 50,000 | 70 | None | 400 | 100 | 45 | 55 | 70 | 95 | 90 | 90 | 85 | 85 |
| 3 | do | 50,000 | 70 | Pluronic L44 | 400 | 100 | 75 | 210 | 460 | 600 | 580 | 500 | 360 | 125 |
| 4 | do | 50,000 | 80 | None | 400 | 100 | 50 | 60 | 75 | 95 | 85 | 85 | 80 | 80 |
| 5 | do | 50,000 | 80 | Pluronic L44 | 400 | 110 | 110 | 260 | 510 | 595 | 575 | 490 | 250 | 45 |
| 6 | Polypropylene glycol | 26,300 | 40 | None | 400 | 100 | 40 | 50 | 75 | 105 | 100 | 95 | 85 | 80 |
| 7 | do | 26,300 | 40 | Pluronic L44 | 400 | 100 | 80 | 205 | 395 | 60 | 570 | 540 | 410 | 210 |
| 8 | do | 26,300 | 66 | None | 400 | 100 | 35 | 55 | 90 | 135 | 135 | 130 | 110 | 105 |
| 9 | do | 26,300 | 66 | Pluronic L44 | 400 | 100 | 100 | 200 | 340 | 525 | 490 | 380 | 200 | 35 |
| 10 | do | 50,000 | 70 | None | 400 | 100 | 30 | 35 | 35 | 40 | 35 | 30 | 30 | 30 |
| 11 | do | 50,000 | 70 | Pluronic L44 | 400 | 100 | 65 | 180 | 335 | 570 | 520 | 440 | 280 | 90 |
| 12 | do | 25,000 | 67 | None | 400 | 100 | 45 | 60 | 80 | 120 | 120 | 120 | 115 | 110 |
| 13 | do | 25,000 | 67 | Pluronic L44 | 400 | 100 | 90 | 165 | 250 | 345 | 320 | 190 | 70 | 50 |
| 14 | | None | | do | 400 | 120 | 45 | 80 | 110 | 155 | 120 | 50 | 25 | 10 |
| 15 | Polypropylene glycol | 26,300 | 65 | None | 400 | 120 | 25 | 30 | 35 | 45 | 40 | 35 | 35 | 35 |
| 16 | do | 26,300 | 65 | Pluronic L44 | 400 | 120 | 75 | 215 | 485 | 600 | 595 | 570 | 470 | 320 |
| 17 | do | 26,000 | 65 | None | 400 | 120 | 25 | 30 | 35 | 35 | 30 | 30 | 30 | 30 |
| 18 | do | 26,000 | 65 | Pluronic L44 | 400 | 120 | 50 | 190 | 445 | 600 | 600 | 570 | 480 | 350 |
| 19 | do | 26,000 | 70 | None | 400 | 120 | 20 | 25 | 35 | 50 | 50 | 45 | 45 | 45 |
| 20 | do | 26,000 | 70 | Pluronic L44 | 400 | 120 | 85 | 270 | 600 | | 590 | 550 | 435 | 190 |
| 21 | do | 26,000 | 75 | None | 400 | 120 | 20 | 25 | 35 | 45 | 40 | 35 | 30 | 30 |
| 22 | do | 26,000 | 75 | Pluronic L44 | 400 | 120 | 75 | 245 | 600 | | 590 | 550 | 270 | 195 |
| 23 | do | 26,000 | 65 | None | 400 | 120 | 30 | 40 | 45 | 65 | 65 | 60 | 55 | 55 |
| 24 | do | 26,000 | 65 | Pluronic L44 | 400 | 120 | 85 | 255 | 600 | | 600 | 570 | 490 | 330 |

TABLE III.—DYNAMIC FOAM TEST—Continued

| Composition No. | Cellulose Condensate | | | Detergent | Flow, ml./min. | Temp., °F. | Dynamic Foam Measurement Test | | | | | | | |
|---|---|---|---|---|---|---|---|---|---|---|---|---|---|---|
| | Reaction Medium | Theoretical, mol. wt. | Percent Ethylene Oxide | | | | Ascent (min.) | | | | Descent (min.) | | | |
| | | | | | | | 0.5 | 2.0 | 5.0 | 10.0 | 0.5 | 2.0 | 5.0 | 10.0 |
| 25 | | None | | Pluronic L42 | 400 | 120 | 10 | 10 | 12 | 12 | 0 | 0 | 0 | 0 |
| 26 | Polypropylene glycol | 26,000 | 65 | do | 400 | 120 | 25 | 40 | 45 | 45 | 35 | 35 | 30 | 25 |
| 27 | | None | | Pluronic L33 | 400 | 120 | 20 | 20 | 20 | 20 | 0 | 0 | 0 | 0 |
| 28 | Polypropylene glycol | 26,000 | 65 | do | 400 | 120 | 45 | 140 | 270 | 410 | 400 | 310 | 170 | 30 |
| 29 | | None | | Pluronic F38 | 300 | 120 | 35 | 115 | 250 | 410 | 390 | 200 | 15 | 5 |
| 30 | Polypropylene glycol | 26,000 | 65 | do | 300 | 120 | 40 | 100 | 210 | 450 | 440 | 430 | 415 | 340 |
| 31 | | None | | Pluronic P46 | 300 | 120 | 30 | 100 | 200 | 350 | 330 | 250 | 140 | 30 |
| 32 | Polypropylene glycol | 26,000 | 65 | do | 300 | 120 | 45 | 150 | 370 | 600 | 595 | 580 | 530 | 390 |
| 33 | | None | | Pluronic L35 | 400 | 120 | 25 | 40 | 60 | 70 | 20 | 5 | 2 | 0 |
| 34 | Polypropylene glycol | 26,000 | 65 | do | 400 | 120 | 70 | 230 | 510 | 600 | 590 | 550 | 309 | 165 |
| 35 | | None | | Pluronic L43 | 400 | 120 | 10 | 10 | 10 | 10 | 0 | 0 | 0 | 0 |
| 36 | Polypropylene glycol | 26,000 | 65 | do | 400 | 120 | 30 | 50 | 70 | 100 | 96 | 80 | 50 | 40 |
| 37 | | None | | Pluronic L64 | 300 | 120 | 30 | 65 | 105 | 180 | 175 | 170 | 130 | 75 |
| 38 | Polypropylene glycol | 26,000 | 65 | do | 300 | 120 | 35 | 85 | 150 | 280 | 215 | 260 | 210 | 160 |
| 39 | | None | | Pluronic P66 | 200 | 120 | 60 | 180 | 305 | 530 | 510 | 485 | 360 | 110 |
| 40 | Polypropylene glycol | 26,300 | 66 | do | 300 | 120 | 55 | 165 | 355 | 585 | 580 | 565 | 530 | 450 |
| 41 | | None | | Tetronic 304 | 400 | 120 | 50 | 130 | 180 | 230 | 70 | 0 | 0 | 0 |
| 42 | Polypropylene glycol | 26,300 | 65 | do | 400 | 120 | 70 | 340 | 600 | | 595 | 535 | 370 | 175 |
| 43 | do | 26,300 | 40 | do | 400 | 120 | 130 | 380 | 600 | | 580 | 550 | 430 | 180 |
| 44 | T. butanol | 50,000 | 70 | do | 400 | 120 | 145 | 430 | 600 | | 580 | 570 | 460 | 120 |
| 45 | | None | | Tetronic 505 | 400 | 120 | 110 | 465 | 530 | 550 | 530 | 420 | 60 | 5 |
| 46 | T. butanol | 50,000 | 70 | do | 400 | 120 | 200 | 570 | 600 | | 590 | 560 | 490 | 240 |
| 47 | Polypropylene glycol | 26,300 | 40 | do | 400 | 120 | 240 | 600 | | | 590 | 550 | 460 | 230 |

Tests 2, 4, 6, 8, 10, 12, 15, 17, 19, 21 and 23 illustrate the low-foaming characteristics of various foam additives employed in aqueous solutions containing no nonionic detergent. Tests 3, 5, 7, 9, 11, 13, 16, 18, 20, 22, 24, 26, 28, 30, 32, 34, 36, 38, 40, 42, 43, 44, 46 and 47 illustrate the foaming characteristics of combinations of various nonionic detergents with the foam additives of the tests referred to above. A comparison of the results of the latter tests with those of the first mentioned tests and with tests 1, 14, 25, 27, 29, 31, 33, 35, 37, 39, 41 and 45 wherein the compositions contained these nonionic detergents alone clearly show that the compositions containing both a nonionic polyoxyalkylene detergent and foam additive have enhanced foaming characteristics over the respective foam additive alone and nonionic detergent alone.

EXAMPLE II

A detergent composition which consists of a polyoxybutylene condensate of cellulose, having a theoretical molecular weight of 12,000 per glucose unit of the cellulose and 65% by weight of oxyethylene groups, prepared by reacting 1,2-butylene oxide with cellulosic material in the presence of polypropylene glycol of 4800 theoretical molecular weight, followed by reaction of the product thereof with ethylene oxide in the presence of the polypropylene glycol of 4800 molecular weight in accordance with the procedure generally set forth above and set forth in copending patent application to John T. Patton, Jr. and Henry E. Reich, Ser. No. 314,480 cited above as the foaming agent and Pluronic Polyol L44 as the nonionic polyoxyalkylene detergent having a ratio of foaming agent to nonionic detergent of 5:100. A 0.1% by weight aqueous solution of the above composition has enhanced and stabilized foaming properties similar to the compositions of this invention set forth in Table III above.

EXAMPLE III

A detergent composition consisting of a polyoxyalkylene condensate of cellulose, having a theoretical molecular weight of 20,000 per glucose unit of the cellulose and 50% by weight of oxyethylene groups, prepared by reacting methyl glycidyl ether with cellulosic material in the presence of a propylene oxide condensate with pentaerythritol, having a theoretical molecular weight of 4000, followed by reaction with ethylene oxide in the presence of the propylene oxide-pentaerythritol condensate according to the procedure generally set forth above and set forth in copending patent application to John T. Patton, Jr. and Henry E. Reich, Ser. No. 314,480 cited above as the foaming agent and Pluronic Polyol L64 as the nonionic polyoxyalkylene detergent having a ratio of foam additive to nonionic detergent of 6:100. A 0.2% by weight aqueous solution of the above composition has enhanced foaming characteristics similar to those of the compositions set forth in Table III above.

EXAMPLE IV

A detergent composition consisting of a polyoxyalkylene condensate of cellulose, having a theoretical molecular weight of 15,000 per glucose unit of the cellulose and 35 percent by weight of oxyethylene groups, prepared by reacting phenyl glycidyl ether with cellulosic material in the presence of a 1,2-butylene oxide condensate with trimethylol propane, having a theoretical molecular weight of 6000, followed by reaction with ethylene oxide in the presence of the 1,2-butylene oxide-trimethylol propane condensate according to the procedure generally set forth above and set forth in copending patent application to John T. Patton, Jr. and Henry E. Reich, Ser. No. 314,480 cited above as the foaming agent and Pluronic Polyol L35 as the nonionic polyoxyalkylene detergent having a ratio of foaming agent to nonionic detergent of 3:100. A 0.5% by weight aqueous solution of the above composition has enhanced foaming characteristics similar to those of the compositions set forth in Table III above.

EXAMPLE V

A detergent composition consisting of a polyoxyalkylene condensate of cellulose, having a theoretical molecular weight of 25,000 per glucose unit of the cellulose and 60 percent by weight of oxyethylene groups, prepared by reacting styrene oxide with cellulosic material in the presence of polypropylene glycol of 6000 theoretical molecular weight, followed by reaction with ethylene oxide in the presence of the propylene glycol according to the procedure generally set forth above and set forth in copending patent appliction to John T. Patton, Jr. and Henry E. Reich, Ser. No. 314,480 cited above as the foaming agent and Tetronic Polyol 304 as the nonionic polyoxyalkylene detergent, having a ratio of foam additive to nonionic detergent of 1:100. A 0.1% by weight aqueous solution of the above composition has enhanced foaming characteristics similar to those of the compositions set forth in Table III above.

It is to be understood that various changes and modifications may be made in the foregoing without departing from the spirit of the invention and the scope of the appended claims.

I claim:
1. A foaming detergent composition consisting essentially of a mixture of polyoxyalkylene condensates of cellulose which are reaction products of from about 40 to 4,000 mols alkylene oxide per glucose unit of cellulose, oxyethylene groups forming at least about 35 weight percent of the oxyalkylene groups of said polyoxyalkylene condensates of cellulose and at least one nonionic detergent selected from the group consisting of (a) a mixture of conjugated polyoxylakylene compounds corresponding to the formula:

$$HO(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90 percent of the total molecular weight of the compound and (b) a mixture of conjugated polyoxyalkylene compounds corresponding to the formula:

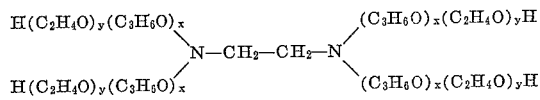

wherein $x$ is sufficiently large to provide a molecular weight of the oxypropylene chains of at least about 250 and wherein $y$ is sufficiently large to provide 10 to 90 percent of the total molecular weight of the compound the weight ratio of said polyoxyalkylene condensates of cellulose to said nonionic detergent ranging from about 1:10,000 to 1:1.

2. The composition of claim 1 wherein said nonionic detergent is a mixture of conjugated polyoxyalkylene compounds corresponding to the formula:

$$HO(C_2H_4O)_a(C_3H_6O)_b(C_2H_4O)_cH$$

wherein $b$ is an integer sufficiently high to provide a molecular weight of at least 900 for the oxypropylene base and wherein $a+c$ is an integer sufficiently high to provide 5 to 90 percent of the total molecular weight of the compound.

3. The composition of claim 1 wherein said nonionic detergent is a mixture of conjugated polyoxyalkylene compounds corresponding to the formula:

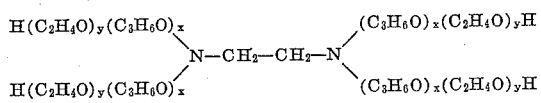

wherein $x$ is sufficiently large to provide a molecular weight of the oxypropylene chains of at least about 250 and wherein $y$ is sufficiently large to provide 10 to 90 percent of the total molecular weight of the compound.

4. A composition according to claim 1 wherein the weight ratio of said polyoxyalkylene condensates of cellulose to said nonionic detergent is from about 1:1000 to 1:10.

5. A composition according to claim 4 wherein said composition includes an inorganic alkaline builder salt and the sum of the amounts of said polyoxyalkylene condensates of cellulose and said nonionic detergent range from about 3 to 20 weight percent of the composition and the amount of said builder salt ranges from about 80 to 97 weight percent.

6. An aqueous washing solution consisting essentially of water and from about 0.01 to 5.0 weight percent of a foaming detergent composition consisting essentially of a mixture of polyoxyalkylene condensates of cellulose which are reaction products of from about 40 to 4,000 mols alkylene oxide per glucose unit of cellulose, oxyethylene groups forming at least about 35 weight percent of the oxyalkylene groups of said polyoxyalkylene condensates of cellulose and at least one nonionic detergent selected from the group consisting of (a) a mixture of conjugated polyoxyalkylene compounds corresponding to the formula:

$$HO(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90 percent of the total molecular weight of the compound and (b) a mixture of conjugated polyoxyalkylene compounds corresponding to the formula:

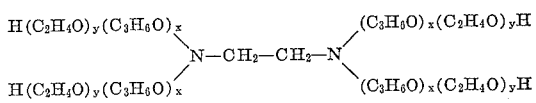

wherein $x$ is sufficently large to provide a molecular weight of the oxypropylene chains of at least about 250 and wherein $y$ is sufficiently large to provide 10 to 90 percent of the total molecular weight of the compound, the weight ratio of said polyoxyalkylene condensate of cellulose to said nonionic detergent ranging from about 1:1000 to 1:10.

7. An aqueous washing solution consisting essentially of water and from about 0.02 to 10 weight percent of a built foaming detergent composition consisting essentially of a mixture of polyoxyalkylene condensates of cellulose which are reaction products of from about 40 to 4,000 mols alkylene oxide per glucose unit of cellulose, oxyethylene groups forming at least about 35 weight percent of the oxyalkylene groups of said polyoxyalkylene condensates of cellulose and at least one nonionic detergent selected from the group consisting of (a) a mixture of conjugated polyoxyalkylene compounds corresponding to the formula:

$$HO(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90 percent of the total molecular weight of the compound and (b) a mixture of conjugated polyoxyalkylene compounds corresponding to the formula:

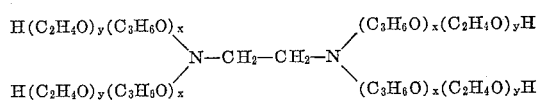

wherein $x$ is sufficiently large to provide a molecular weight of the oxypropylene chains of at least about 250 and wherein $y$ is sufficiently large to provide 10 to 90 percent of the total molecular weight of the compound and an inorganic alkaline builder salt, the ratio of said polyoxyalkylene condensate of cellulose to said nonionic detergent ranging from about 1:1000 to 1:10, the sum of the amounts of said polyoxyalkylene condensates of cellulose and said nonionic detergent ranging from about 3 to 20 weight percent of the composition and the amount of said builder salt ranging from about 80 to 97 weight percent.

8. The composition of claim 4 wherein said polyoxyalkylene condensates of cellulose are the reaction products of propylene oxide and ethylene oxide, successively, with cellulose wherein the theoretical molecular weight of the polyoxypropylene chains ranges from about 25,000 to 50,000 and the weight percent of the oxyethylene groups in the cellulose condensate ranges from about 40 to 70.

9. The composition of claim 4 wherein said polyoxyalkylene condensates of cellulose are reaction products of butylene oxide and ethylene oxide, successively, having a theoretical molecular weight of the polyoxybutylene chains of about 12,000 per glucose unit of the cellulose and a weight percent of the oxyethylene groups in the cellulose condensate of about 65 percent, the weight ratio of said polyoxyalkylene condensates of cellulose to said nonionic detergent being about 5:100.

References Cited

UNITED STATES PATENTS

| | | | |
|---|---|---|---|
| 1,941,278 | 12/1933 | Schorger | 260—231 |
| 2,088,085 | 7/1937 | Gross et al. | 252—351 XR |
| 2,135,128 | 11/1938 | Thomas et al. | 260—231 |
| 2,674,619 | 4/1954 | Lundsted. | |
| 2,920,045 | 1/1960 | Hearn et al. | 252—137 |
| 2,979,528 | 4/1961 | Lundsted. | |
| 3,131,176 | 4/1964 | Klug | 260—231 |
| 3,131,177 | 4/1964 | Klug et al. | 260—231 |

LEON D. ROSDOL, *Primary Examiner.*

ALBERT T. MEYERS, *Examiner.*

M. WEINBLATT, *Assistant Examiner.*